Dec. 2, 1958   J. P. KRIECHBAUM   2,862,666
FORCED AIR FURNACE CONTROL APPARATUS
Filed Dec. 22, 1954   2 Sheets-Sheet 1

INVENTOR
JOHN P. KRIECHBAUM
BY Joseph E. Ryan
ATTORNEY

Dec. 2, 1958     J. P. KRIECHBAUM     2,862,666
FORCED AIR FURNACE CONTROL APPARATUS

Filed Dec. 22, 1954     2 Sheets-Sheet 2

INVENTOR
JOHN P. KRIECHBAUM

BY Joseph E. Ryan
ATTORNEY

United States Patent Office 2,862,666
Patented Dec. 2, 1958

2,862,666

FORCED AIR FURNACE CONTROL APPARATUS

John P. Kriechbaum, Minneapolis, Minn., assignor to Minneapolis-Honeywell Regulator Company, Minneapolis, Minn., a corporation of Delaware Application December 22, 1954, Serial No. 477,037

11 Claims. (Cl. 236—9)

The present invention is concerned with apparatus for controlling the operation of a forced air furnace, in particular, apparatus comprising a switch having a liquid filled operator with two remotely located bulbs connected thereto in a closed system.

With the increasing popularity and demand for downdraft or horizontal flow forced air furnaces for use in domestic dwellings, there is a need for an inexpensive and yet reliable control apparatus for controlling the operation of either the fan or the burner, or both. The present invention makes use of a switch operated in response to the temperature of the air in a plurality of localities in the plenum. The switch is controlled by a liquid filled operator to which a plurality of bulbs are connected thereto, one bulb being responsive to the temperature of the air of the plenum near the inlet opening and the other being responsive to the temperature of the air near the exhaust opening. The switch is thus actuated in response to the two temperatures so that when the switch is used as a limit control it will function during normal operation, with the fan running, by limiting the exhaust air temperature by shutting the burner off when the fan is not in operation and there is an up flow of air by convection in the furnace the second bulb is also effective to shut down the burner.

A second embodiment of the present invention uses a dual switch also actuated by the liquid filled operator in response to the two temperatures, the first switch controls the fan and the second acts as the high limit control for the burner.

It is therefore an object of the present invention to provide in a control apparatus for a forced air furnace an improved and inexpensive limit control responsive to the temperatures in two localities in the furnace plenum.

Another object of the present invention is to provide an improved control apparatus for a forced air furnace in which a fan and burner is controlled in response to the temperature in the inlet and discharge portions of the furnace plenum.

Still another object of the present invention is to provide in a control apparatus for a forced air furnace a switch device having a plurality of contacts for controlling the furnace fan and burner, the switch device having a liquid filled operator responsive to the temperature in the inlet and exhaust portions of the furnace plenum.

These and other objects of the present invention will become apparent upon reading the specification and appended claims.

Figure 1:
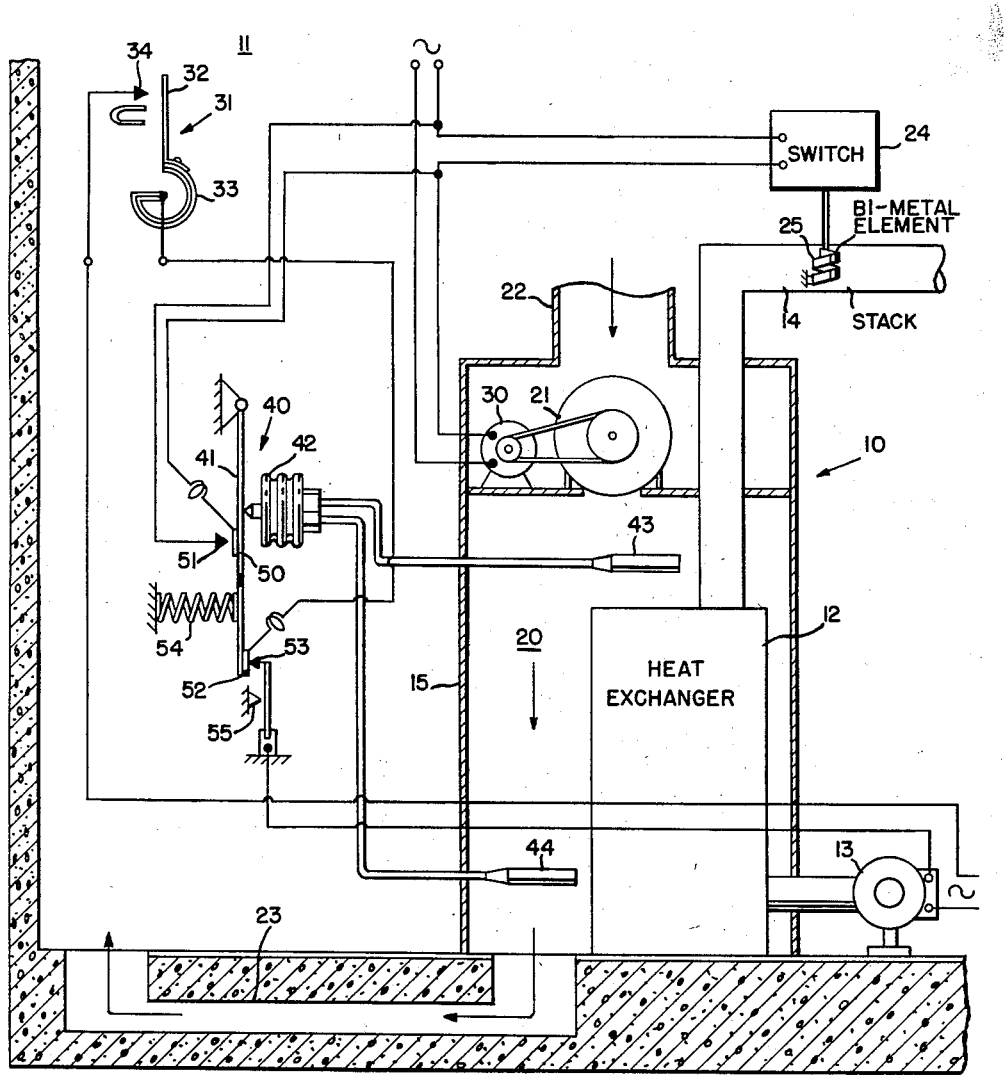
Figure 1 is a schematic drawing of a downdraft furnace showing the dual bulb operated switch for controlling the operation of the furnace fan and burner.

Referring to Figure 1, a furnace 10 of a down draft forced air type is shown for furnishing heated air to a space or room 11. Furnaces of this type usually have a heat exchanger 12 receiving heat from a burner 13. The combustion gases from the furnace are exhausted through a stack 14. Surrounding the heat exchanger is a furnace casing 15 which encloses the plenum or bonnet 20 into which air is forced from an upper opening by a fan 21 as it returns from the space through a return duct 22. The air, under the force of the fan, moves downward past the heat exchanger to exhaust at the lower end of the plenum into a duct 23 which delivers conditioned air to the space. Furnaces of this type are normally used in houses or dwellings having no basements where to have air delivered through openings near the floor it is necessary to discharge the conditioned air through the bottom of the furnace into suitable passages in the floor. With such furnaces it is, of course, obvious that operation cannot exist without a fan. Normal circulation by convection would cause the air to move upward through the furnace. In order to have suitable control of the fan it is thus necessary to provide some sort of circuit so that the fan will be energized whenever heat is supplied to the heat exchanger, this cannot be adequately done by a temperature responsive element above the heat exchanger as is done in the conventional forced air furnace, as once the fan is energized the downward movement of the air through the plenum would cool the temperature responsive element down and cause a short cycling condition to exist in the fan.

A stack switch 24 having a bimetallic element 25 responsive to the temperature of the gases exhausted from the furnace is used to connect a fan motor 30 to a source of power. Switch 24 is of a conventional type having a spiral bimetal which upon increasing in temperature causes rotation of a shaft to close a switch, such a switch is set to close whenever the stack temperature rises.

A thermostat 31 of the conventional type having a movable member 32 positioned in response to the movement of a bimetallic element responsive to the room or space temperature, engages a contact 34 whenever the room temperature drops below some selected value. The thermostat connects the control circuit of burner 13 to a source of power and as shown upon member 32 engaging contact 34 the burner is energized and heat would be supplied to the furnace. As the combustion gases increase in temperature, switch 24 is closed and the fan motor starts the circulation of air downward past the heat exchanger.

A switch 40 has a movable member 41 pivoted about one end by a liquid filled pressure responsive operator 42. Connected to operator 42 are two liquid filled bulbs 43 and 44 in a closed liquid filled system. Bulb 43 is mounted in the upper portion of plenum 20 responsive to the air above the heat exchanger and bulb 44 is mounted in the lower portion of the plenum near the discharge opening responsive to the temperature of the air entering duct 23. Lever 41 has mounted thereon a contact bar 50 which upon movement of lever clockwise engages contact 51 to form a switch which is connected in parallel with switch 24. A second contact bar 52 mounted on lever 40 and electrically isolated from contact bar 50 engages contact 53 when lever 41 is biased to its far counterclockwise position by a spring 54. Contact 53 has a suitable stop 55 so that a connection exists between contacts 53 and 52 for a first portion of the movement of lever 41 clockwise about its upper pivot point. After the engagement of contact 51 and bar 50, upon further movement of lever 41, contact 53 hits stop 55 to hold it away from bar 52. Contact 53 and bar 52 form a switch which is connected in series with thermostat 31 to provide a high limit control action for burner 13.

As shown, the burner is not operating and the temperature of the gases in the stack is low and fan motor 30 is deenergized. Upon a drop in the room temperature below some selected value, thermostat 31 closes to energize burner 13. Upon a slight increase in stack temperature switch 24 closes to start fan 21. As the heat exchanger increases in temperature and the air surrounding it increases in temperature, bulb 44 is warmed up to expand the liquid therein and cause operator 42 to move lever 41 clockwise about its pivot point to close the circuit through contact 51 and bar 50 thus shunting the stack switch 24. As the fan is already in operation this has no present effect; however, when the thermostat becomes satisfied and the burner is deenergized, the stack temperature decreases and switch 24 opens. The fan continues to run even though switch 24 is open as it is now under the control of switch 40 and remains in operation until a large amount of the heat available in the furnace is delivered to the zone. As the heat exchanger decreases in temperature and the air moving downward past the bulb 44 cools the bulb to some low value, lever 41 will move to the right to break the engagement between contact 51 and bar 50, shutting down the fan.

Should the temperature in the furnace become excessive during its normal operation an increase in the temperature of bulb 44 above a second predetermined value further expands operator 42. The temperature of bulb 44 remains relatively low and constant during fan operation as it is near the inlet. Lever 41 is then moved to the left breaking the engagement between contact 53 and bar 52, thus shutting down the burner until the temperature in the plenum decreased to a safe value. Should the fan become inoperative or the flow of air through the furnace be blocked in some manner, a limiting action also takes place whenever bulb 43 increases in temperature to expand operator 42. In fact, a faster shutdown of the burner would take place as bulb 44 is warm. The normal rising of the hot air by convection would immediately increase the temperature of bulb 43 so that both bulbs are effective to expand the liquid in the system thereby moving lever 41 to the left to break the engagement between contact 52 and bar 53.

Figure 2:
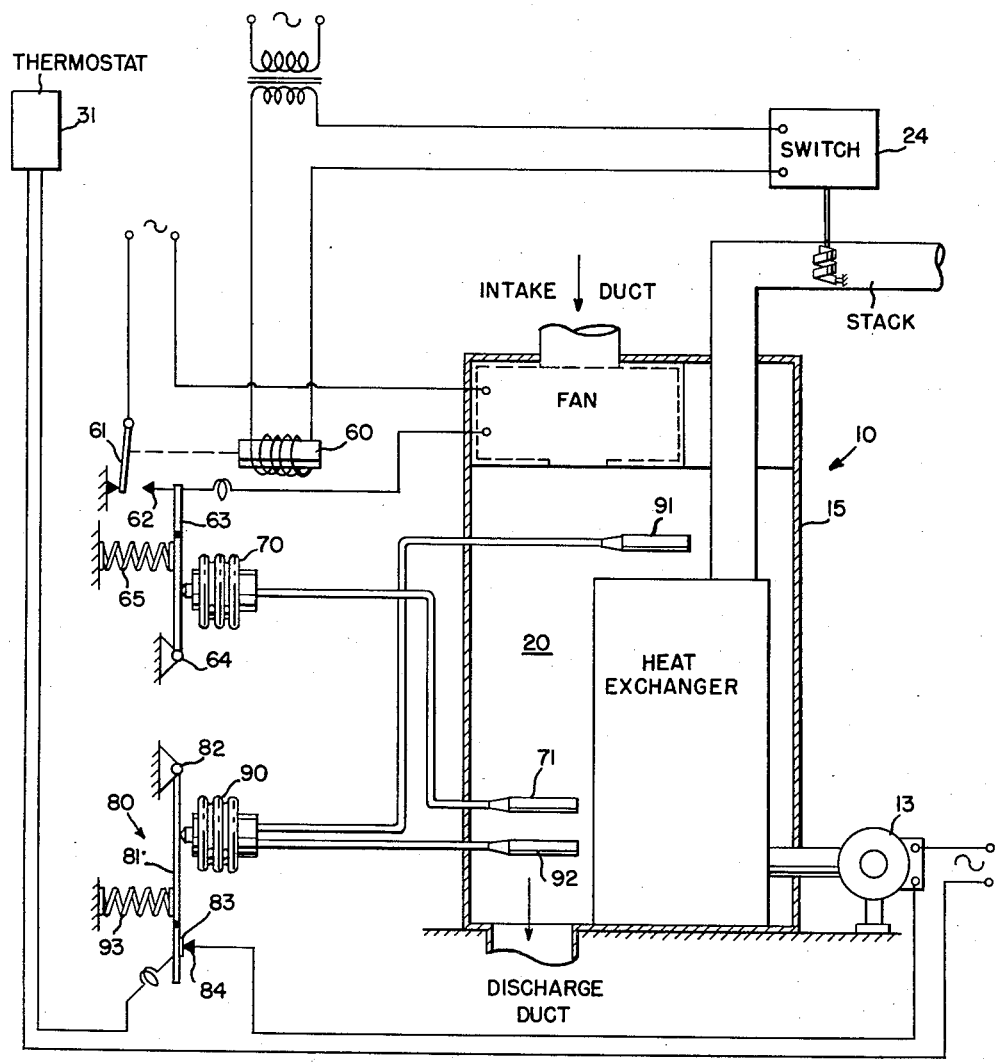
Figure 2 is a schematic drawing of a second embodiment of a downdraft furnace control apparatus showing the dual bulb operated switch for controlling in a temperature limiting manner the operation of the burner.

A second embodiment of the invention is shown in Figure 2. A similar downdraft forced air furnace is shown having a fan, a heat exchanger and a burner and operates in substantially the same manner as the furnace of Figure 1. Switch 24 connects the winding of a relay 60 to a source of power, the relay having a movable member 61 which is moved to the right against a contact 62 when the relay is energized, to close a circuit connecting the fan to a source of power. Contact 62 is carried on a lever 63 pivoted about its lower extremity 64 and biased in a clockwise direction by a spring 65. A liquid filled operator 70 having a remotely located bulb 71 responsive to the temperature of the air in the lower portion of the plenum 20 engages lever 63 so that whenever bulb 71 is above a predetermined temperature lever 63 and contact 62 is moved against movable member 61 of the relay. Should the relay be deenergized once the plenum temperature is above the predetermined value the fan will continue to run until the plenum temperature decreases to some predetermined lower value. The operation of the furnace is similar to that as mentioned before in connection with Figure 1, that is, upon a call for heat by the thermostat the burner is energized and the stack temperature increases. Upon a slight rise in stack temperature relay 60 is energized and the movable member 61 engages contact 62 to begin operation of the fan. As the temperature of the air in the plenum increases and bulb 71 causes movement of lever 63 to the left, contact 62 is moved to the left, so that the fan continues operation oven after burner 13 is deenergized and switch 24 opens due to a drop in stack temperature.

A limit switch 80 has a movable member 81 pivoted at its upper extremity 82. Member 81 has a contact bar 83 and an associated contact 84 connected in series with the thermostat, this circuit is normally closed so that the burner is under the control of the thermostat. Pressure responsive operator 90 has two bulbs 91 and 92 connected in a closed liquid filled system thereto. Bulb 91 is mounted in the upper portion of the plenum and bulb 92 is mounted in the lower portion of the plenum near the discharge duct. Whenever the temperature of bulb 92 exceeds a predetermined value operator 90 moves member 81 to the left against a spring 93 to open the burner control circuit. During normal operation with the fan operating bulb 92 normally acts as a limiting element. However, should the fan stop or the flow of air through the furnace be blocked and bulb 91 increases in temperature it also is effective to move member 81 to the left to break the burner control circuit.

While particular embodiments of the invention are shown as applied to a forced air downdraft heating installation, it is of course applicable to horizontal flow furnaces as well as other types, thus it is intended that the scope of the invention only be limited by the appended claims in which I claim:

1. In control apparatus for controlling the operation of a down-draft forced air furnace having a heat exchanger with a burner having a control circuit and a fan for forcing air from an inlet duct downward past the heat exchanger and through a discharge duct, first switch means responsive to the temperature of stack gases of the furnace, said switch being normally closed when the stack gas temperature rises; a source of power; second and third switch means having a liquid filled operator, said operator having two remotely located bulbs connected thereto, a first of said bulbs being responsive to the inlet air to the furnace and a second of said bulbs being responsive to the discharge air of the furnace, said operator upon an expansion of the liquid in said bulbs first closing said second switch means and upon further expansion of said liquid opening said third switch means; connection means including said first and second switch means, connected in parallel, for connecting said fan to said source of power; further connection means including said third switch means for connecting said burner control circuit to said source of power so that initially upon energizing the burner a rise in the stack temperature will initiate operation of said fan, however control of the fan as the furnace heats up is obtained through said second switch means to continue fan operation as long as the discharge air is above a predetermined temperature, the temperature limiting of the air around the heat exchanger being determined by the combined effects of said bulbs upon said third switch means so that it opens when an excessive furnace temperature is reached.

2. In control apparatus for controlling the operation of a forced air furnace, the furnace having a heat exchanger and a fan which forces air downward through the plenum of the furnace from the upper inlet to the exhaust through the lower portion of the furnace; first switch means having means responsive to the temperature of the stack gases of the furnace, said switch means being closed when the temperature of the gases rises above a predetermined value; a source of heat supplied to the heat exchanger; second and third switch means each being controlled by a liquid filled operator having a plurality of remotely located bulbs connected thereto, one of said bulbs being responsive to the temperature of inlet air of the furnace, another of said bulbs being responsive to the temperature of the exhaust air; connection means including said first and second switch means connecting the fan to a source of power whereby said first switch closes upon the initial operation of said source of heat as the stack temperature increases and said second switch means maintains operation of the fan after deenergization of said source of heat until the plenum temperature drops below a predetermined value; and means including said third switch means for deenergizing said source of heat when the plenum temperature at the inlet or exhaust, or both, exceeds a safe value.

3. In control apparatus for controlling the operation of a furnace, the furnace having a heat exchanger, receiving heat from a burner, and a surrounding plenum into which air is forced by a fan from an upper inlet opening and out through a lower discharge opening; a source of power; first and second switch means; a liquid filled operator having a plurality of remotely located bulbs connected thereto, a first of said bulbs being responsive to the temperature of the air at said inlet, a second of said bulbs being responsive to the air at said discharge, means connecting said operator in controlling relation to said first and second switch means so that upon the expansion of the liquid due to a temperature increase of said bulbs said first switch will close and upon a further temperature increase said second switch will open; temperature responsive switch means responsive to room temperature; means including said temperature responsive switch means and said second switch means for connecting the burner to said source of power; further means including said first switch means for connecting the fan to said source of power.

4. In control apparatus for controlling the operation of a down draft furnace, the furnace having a heat exchanger with a source of heat, the heat exchanger being surrounded by a plenum into which air is forced by a fan through an upper inlet opening and out through a lower outlet opening; first switch means responsive to the temperature of the air at the lower end of the plenum near the outlet opening; said first switch means closing when the temperature of the air reaches a predetermined value, means including said first switch means for controlling the fan; second switch means having an operator with a plurality of remotely located bulbs connected thereto in a liquid filled system, a first of said bulbs being responsive to the temperature of the air in the upper portion of the plenum, a second of said bulbs being responsive to the temperature of the air in the lower portion of the plenum near the outlet opening, said second switch means opening whenever the temperature in the plenum exceeds a predetermined value; temperature responsive switch means responsive to room temperature, and means including said second switch means and said temperature responsive switch means for controlling the source of heat.

5. In control apparatus for controlling the operation of a down draft forced air furnace, first and second switch means having a liquid filled operator to which a plurality of liquid filled bulbs are connected in a closed system; a first of said bulbs being responsive to the temperature of the air in the upper portion of the plenum of the furnace, a second of said bulbs being responsive to the temperature of the air in the lower portion of the plenum, said first switch means closing when the temperature of the air exceeds a selected value and said second switch means opening when the temperature of the air exceeds a higher selected value, connection means including said first switch means for connecting a fan to a source of power, the fan forcing air downward through the furnace; and further connection means including said second switch means for connecting a source of heat for the furnace to a source of power.

6. In control apparatus for controlling the operation of a down draft forced air furnace; switch means having a liquid filled operator to which a plurality of bulbs are connected in a closed liquid filled system, a first of said bulbs being responsive to the temperature of the air in the upper portion of the plenum of the furnace, a second of said bulbs being responsive to the temperature of the air in the lower portion of the plenum, said switch being closed whenever the temperature of the air in the upper and lower portions of said plenum is below a selected value; a burner for supplying heat to the furnace, said burner having a control circuit; a source of power; means including said switch means for connecting said control circuit to said source of power.

7. In control apparatus for controlling the operation of a forced air furnace; switch means having a liquid filled operator to which a plurality of bulbs are connected in a closed liquid filled system, a first of said bulbs being responsive to the temperature of the air in the upper inlet end of the plenum of the furnace, a second of said bulbs being responsive to the temperature of the air in the lower exhaust end of said plenum, said switch being open whenever the temperature of the air in said ends is above a selected value; a burner for supplying heat to the furnace, said burner having a control circuit; and means including said switch means for connecting said control circuit to a source of power so that upon the existence of an excessive temperature in the plenum the burner will become inoperative.

8. In control apparatus for controlling the operation of a forced air down draft furnace; first and second switch means having an operator to which a plurality of bulbs are connected in a closed liquid filled system, a first of said bulbs being responsive to the temperature of the air in one end of the plenum of the furnace, a second of said bulbs being responsive to the temperature of the air in the other end of the plenum, said first switch means being open when the temperature of the air in said ends of the plenum is below a predetermined value, said second switch means being normally closed when the temperature of the air in said ends is below a second higher predetermined value; means including said first switch means for connecting a fan for forcing air through the furnace to a source of power; and further means including said second switch means for connecting a furnace heating means to a source of power.

9. In control apparatus for controlling the operation of a down draft forced air furnace; a source of heat associated with a heat exchanger in the furnace, said source having a control circuit; switch means having an operator, said operator having a plurality of bulbs, a first of said bulbs being responsive to the temperature of air in the furnace plenum at the inlet of the heat exchanger, a second of said bulbs being responsive to the temperature of the air in the plenum at the exhaust of the heat exchanger; and means including said switch means for connecting said control circuit to a source of power so that whenever the temperature in said plenum exceeds a predetermined value said source of heat will be shut down.

10. In control apparatus for controlling the operation of a down draft forced air furnace; a source of heat for the furnace associated with a heat exchanger in the furnace, said source having a control circuit; a fan mounted on the furnace in a manner to force air through the furnace by the heat exchange; a pair of switches; a plurality of temperature responsive liquid filled bulbs, a first of said bulbs responsive to the temperature of the air at the inlet of the heat exchanger, a second of said bulbs responsive to the temperature of the air at the exhaust of the heat exchanger; means including said bulbs for operating said switches; a source of power; connection means including one of said switches for connecting said fan to said source of power, said switch being closed whenever the temperature of the air in the furnace is above a predetermined value; and further connection means including other of said switches for connecting said control circuit to said source of power, said other switch being opened whenever the temperature of the air in the furnace exceeds a second higher predetermined value.

11. In a down-draft forced air furnace control, first switch means being normally closed when the temperature of the furnace is above a selected value, a source of power, connection means including said switch means for connecting a furnace blower motor to said source of power, second switch means, actuator means for controlling said second switch means, said actuator means having a plurality of bulbs connected thereto in a filled system, a first of said bulbs being responsive to the temperature near the air inlet of the furnace plenum, a second of said bulbs being responsive to the temperature near the air exhaust of the furnace plenum, and connecting means including said second switch means for connecting a burner to said source of power.

References Cited in the file of this patent

UNITED STATES PATENTS

| | | |
|---|---|---|
| 168,297 | Tingley | Sept. 26, 1875 |
| 1,558,848 | Doble | Oct. 27, 1925 |
| 1,850,466 | Martin | Mar. 22, 1932 |
| 2,058,491 | Noble | Oct. 27, 1936 |
| 2,322,405 | White | June 22, 1943 |
| 2,490,919 | Raney | Dec. 13, 1949 |
| 2,776,797 | Suesserott | Jan. 8, 1957 |